(12) United States Patent
Cho et al.

(10) Patent No.: US 8,145,133 B2
(45) Date of Patent: Mar. 27, 2012

(54) METHOD AND APPARATUS OF SHARING SPECTRUM WITH LEGACY COMMUNICATION SYSTEM

(75) Inventors: Joon Ho Cho, Gyeongsangbuk-do (KR); Yeo-Hun Yun, Gyeongsangbuk-do (KR)

(73) Assignee: Postech Academy-Industry Foundation, Pohang (KR)

( * ) Notice: Subject to any disclaimer, the term of this patent is extended or adjusted under 35 U.S.C. 154(b) by 732 days.

(21) Appl. No.: 12/277,407

(22) Filed: Nov. 25, 2008

(65) Prior Publication Data
US 2009/0286480 A1 Nov. 19, 2009

(30) Foreign Application Priority Data
May 15, 2008 (KR) .................. 10-2008-0044864

(51) Int. Cl.
*H04B 1/00* (2006.01)
*H04B 15/00* (2006.01)
(52) U.S. Cl. ..................................... 455/63.1; 455/63.3
(58) Field of Classification Search ............. 455/62, 455/63.1, 63.3
See application file for complete search history.

(56) References Cited

U.S. PATENT DOCUMENTS
2004/0092281 A1* 5/2004 Burchfiel ...................... 455/522

OTHER PUBLICATIONS

Wu et al., "Capacity of a Class of Cognitive Radio Channels: Interference Channels with Degraded Message Sets", IEEE Transactions on Information Theory, vol. 53, No. 11, Nov. 2007, pp. 4391-4399.
Jovicic, Aleksandar, "Cognitive Radio: An Information-Theoretic Perspective", ISIT 2006, Seattle, USA, Jul. 9-14, 2006, pp. 2413-2417.
Zhang, Rui, "Exploiting Multi-Antennas for Opportunistic Spectrum Sharing in Cognitive Radio Networks", IEEE Journal of Selected Topics in Signal Processing, vol. 2, No. 1, Feb. 2008, pp. 88-102.
Hong et al., "An Adaptive Transmission Scheme for Cognitive Radio Systems Based on Interference Temperature Model", IEEE CCNC 2008 Proceedings, pp. 69-73.
Cho et al., "Continuous-Time Equivalents of Welch Bound Equality Sequences", IEEE Transactions on Information Theory, vol. 51, No. 9, Sep. 2005, pp. 3176-3185.
Cho et al., "An Optimal Signal Design for Band-Limited Asynchronous DS-CDMA Communications", IEEE Transactions on Information Theory, vol. 48, No. 5, May 2002, pp. 1172-1185.
Mir et al., "Optimum Transmitter/Receiver Design for a Narrowband Overlay in Noncoordinated Subscriber Lines", IEEE Transactions on Communications, vol. 52, No. 6, Jun. 2004, pp. 992-998.
Cho, Joon Ho, "Joint Transmitter and Receiver Optimization in Additive Cyclostationary Noise", IEEE Transactions on Information Theory, vol. 50, No. 12, Dec. 2004, pp. 3396, 3405.

* cited by examiner

*Primary Examiner* — David Mis
(74) *Attorney, Agent, or Firm* — Occhiuti Rohlicek & Tsao LLP

(57) ABSTRACT

A method of sharing spectrum with a legacy communication system includes acquiring spectrum correlation of the legacy communication system, and generating a transmit waveform based on the spectrum correlation. Unlike conventional cognitive radios that utilize spectrum holes only, the proposed method can also utilize spectrally correlated frequency components where primary-user signals are present.

6 Claims, 13 Drawing Sheets

METHOD AND APPARATUS OF SHARING SPECTRUM WITH LEGACY COMMUNICATION SYSTEM

CROSS-REFERENCE TO RELATED APPLICATIONS

This application claims the benefit of priority of Korean Patent Application No. 10-2008-0044864 filed on May 15, 2008 which is incorporated by reference in its entirety herein.

FIELD OF THE INVENTION

The invention relates to a method and apparatus for sharing frequency bands with a legacy communication system.

DESCRIPTION OF THE RELATED ART

One of the fundamental problems in communication engineering is to design a jointly optimal pair of a transmitter and a receiver that reliably transfers information over a channel between a source and a sink. Among various joint transmitter-receiver optimization problems, designing the optimal transmit and receive waveforms for a transmitter employing linear modulation and an receiver having a linear filter front-end has long been paid much attention, where the objective is to minimize the mean-squared error (MSE) or, equivalently, maximize the signal-to-interference-plus-noise ratio (SINR) at the output of the linear receiver.

Recently, cognitive radio technology has attracted a lot of research interest for their potential to dramatically increase intensity and efficiency in radio spectrum utilization. Since next generation wireless communication systems require more frequency resources, it is necessary to efficiently utilize limited frequency resources. However, in some study, it is shown that the spectral efficiency is below 30% in practical wireless communication systems. The cognitive radio technology is a method to share unused frequency resources between wireless communication systems. In cognitive radio communication system, a secondary user (also refer to as an unlicensed user) performs spectrum sensing to search unused frequency resources which are not used by a primary user (also refer to as a licensed user). The secondary user may utilize the unused frequency resources to improve spectral efficiency.

In the cognitive radio technology, one of design criteria is to minimize the interference between the primary user and the secondary user.

In W. Wu, S. Vishwanath, and A. Arapostathis, 'Capacity of a class of cognitive radio channels-interference channels with degraded message sets', IEEE Transactions on Information Theory, vol. 53, no. 11, pp. 4391-4399, November 2007, information-theoretic approaches are taken to cognitive radio design with the channel modeled as a two-sender two-receiver interference channel. The capacity region is characterized and/or its bounds are derived, where in general a rate pair is achievable through joint code design at the primary and the secondary transmitters. The joint code design necessitates the update or replacement of a single-user encoder/decoder pair in the primary-user side to allow secondary-user service. Such an update may not be desirable in some applications of the cognitive radio technology.

In A. Jovicic and P. Viswanath, 'Cognitive radio: an information-theoretic perspective', in proceedings IEEE International Symposium on Information Theory (ISIT)'06, Seattle, USA, Jul. 9-14, 2006, pp. 2413-2417, a similar approach is taken under the constraint that no interference is generated to the primary user, where no interference means that no penalty in primary user's SINR is incurred by the secondary transmitter. This cognitive radio is assumed to have an access to the message of the primary transmitter. This enables the cognitive radio to transmit its own data stream and, at the same time, to transmit the data stream of the primary user, so that the power of the primary user signal as well as that of the interference can be increased simultaneously at the primary receiver. Thus, a fixed single-user transmitter-receiver pair is used at the primary side while the secondary user enters and exits the frequency band. Such unidirectional cooperation of the secondary transmitter, however, is not possible if no message of the primary transmitter is available to the secondary transmitter. Of course, a cognitive radio must be provided directly or indirectly some information about the primary user's signaling and system parameters in order to tactically design its transmitted signal. However, the assumption of known message may be excessive for the practical implementation of a cognitive radio.

In L. Zhang, Y.-C. Liang, and Y. Xin, 'Joint beamforming and power allocation for multiple access channels in cognitive radio networks', IEEE Journal on Selected Area in Communication, vol. 26, no. 1, pp. 38-51, January 2008, cognitive radios are designed that induce nonzero but limited amount of interference at the primary receivers without the assumption of known message. The interference is simply defined as the transmit power of the secondary user times the channel gain from the secondary transmitter to the primary receiver. So, the amount of information needed at the secondary transmitter is very small. This pre-processing interference, however, may not be relevant enough to properly assess the performance degradation of the primary users than the post-processing interference that can be defined as the amount of interference obtained after the primary receivers perform front-end and/or following signal processing.

SUMMARY OF THE INVENTION

A method and apparatus for sharing spectrum with at least one legacy communication system is provided.

In an aspect, a method of sharing spectrum with a legacy communication system includes acquiring spectrum correlation of the legacy communication system, and generating a transmit waveform based on the spectrum correlation.

The method may further include generating a transmit signal by combining the transmit waveform and a data signal, and transmitting the transmit signal.

In an embodiment, the spectrum correlation may be related to statistical characteristics of the legacy communication system or be related to correlations of signals of the legacy communication system in frequency domain. The transmit waveform may be generated by using Vectorized Fourier Transform (VFT).

In an embodiment, the transmit waveform may be generated by determining a power spectral density (PSD) matrix $R_N(f)$ based on the spectrum correlation, determining a channel correlation matrix $C(f)$ by using the PSD matrix $R_N(f)$ and a channel matrix $H(f)$, determining a projection matrix $P(f)$, determining an eigenvalue $\lambda_{max}(f)$ of $P(f)C(f)$, determining a normalized eigenvector $v_{max}(f)$ corresponding to the $\lambda_{max}(f)$, and determining the transmit waveform $s_{opt}(f)$ from the eigenvector $v_{max}(f)$. The eigenvalue $\lambda_{max}(f)$ may be the largest eigenvalue of the $P(f)C(f)$. The projection matrix $P(f)$ may be determined by using a blocking matrix $G(f)$ obtained from impulse responses of the legacy communication system.

In another aspect, a transmitter for sharing spectrum with a legacy communication system includes a waveform generator for generating a transmit waveform, and a Radio Frequency (RF) unit for transmitting a radio signal based on the transmit waveform. The waveform generator is configured to acquire spectrum correlation of the legacy communication system, and generate the transmit waveform based on the spectrum correlation.

In still another aspect, a receiver for sharing spectrum with a legacy communication system includes a waveform generator for generating a receive waveform, and a RF filter for filtering a receive signal based on the receive waveform. The waveform generator is configured to acquire spectrum correlation of the legacy communication system, and generate the receive waveform based on the spectrum correlation.

DESCRIPTION OF EXEMPLARY EMBODIMENTS

Hereinafter, a legacy communication system means a communication system which uses a licensed frequency band. The legacy communication system provides services to a primary user or a licensed user. An overlay communication system means a communication system which shares the frequency band with one or more legacy communication systems. The overlay communication system provides services to a secondary user or an unlicensed user. The overlay communication system may also be referred to as a cognitive radio system.

Figure 1:
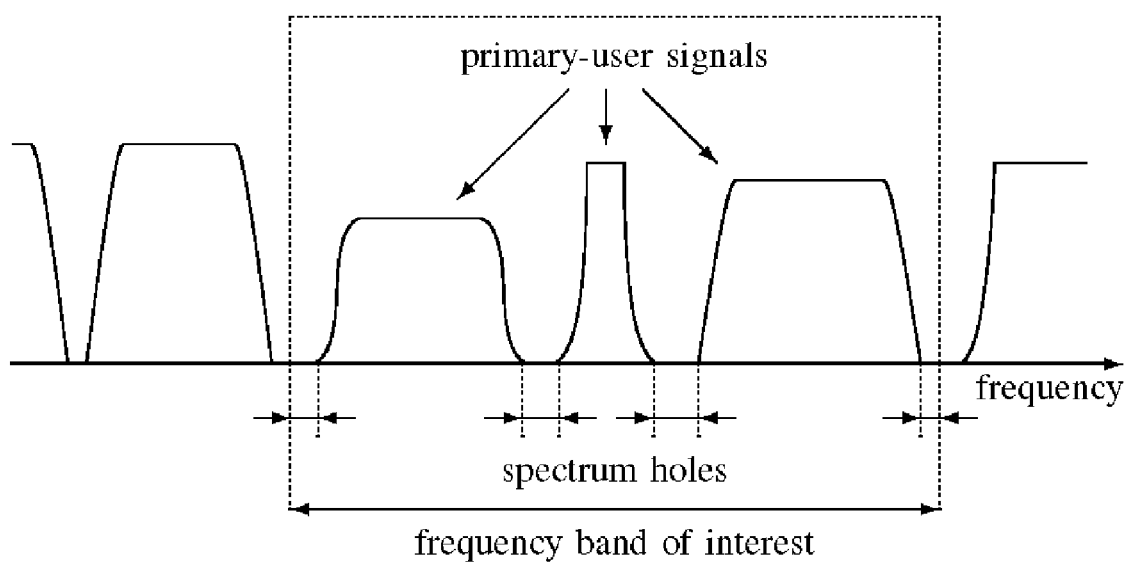
FIG. 1 shows a typical cognitive radio channel.

FIG. 1 shows a cognitive radio channel. There are three primary user signals inside the frequency band of interest, and a white space without the primary user signals consists of four spectrum holes. Since the utilization of the frequency component other than the spectrum holes may result in a dramatic increase of the spectral efficiency, we make the following assumptions: 1) the overall primary user signal is second-order wide-sense cyclostationary (WSCS), 2) each primary receiver is equipped with a linear filter front-end whose output is sampled at an integer multiple of the cycle frequency, 3) the information about the secondary-to-primary channels, the receive-filter waveforms, and the sampling timing of the primary receivers is available at the secondary transmitter. Notice that linear modulation, which is one of the most popular modulation schemes for digital communication, results in cyclostationarity of the transmitted signal with the fundamental cycle frequency equal to the symbol rate and is usually accompanied by a linear filter front-end whose output is sampled at an integer multiple of the symbol rate. It will be shown that, under these assumptions and certain conditions, it is possible to find the optimal pair of the transmit and the receive waveforms that can utilize the gray and the black spaces and, at the same time, induces zero interference to the outputs of the primary receivers.

Figure 2:
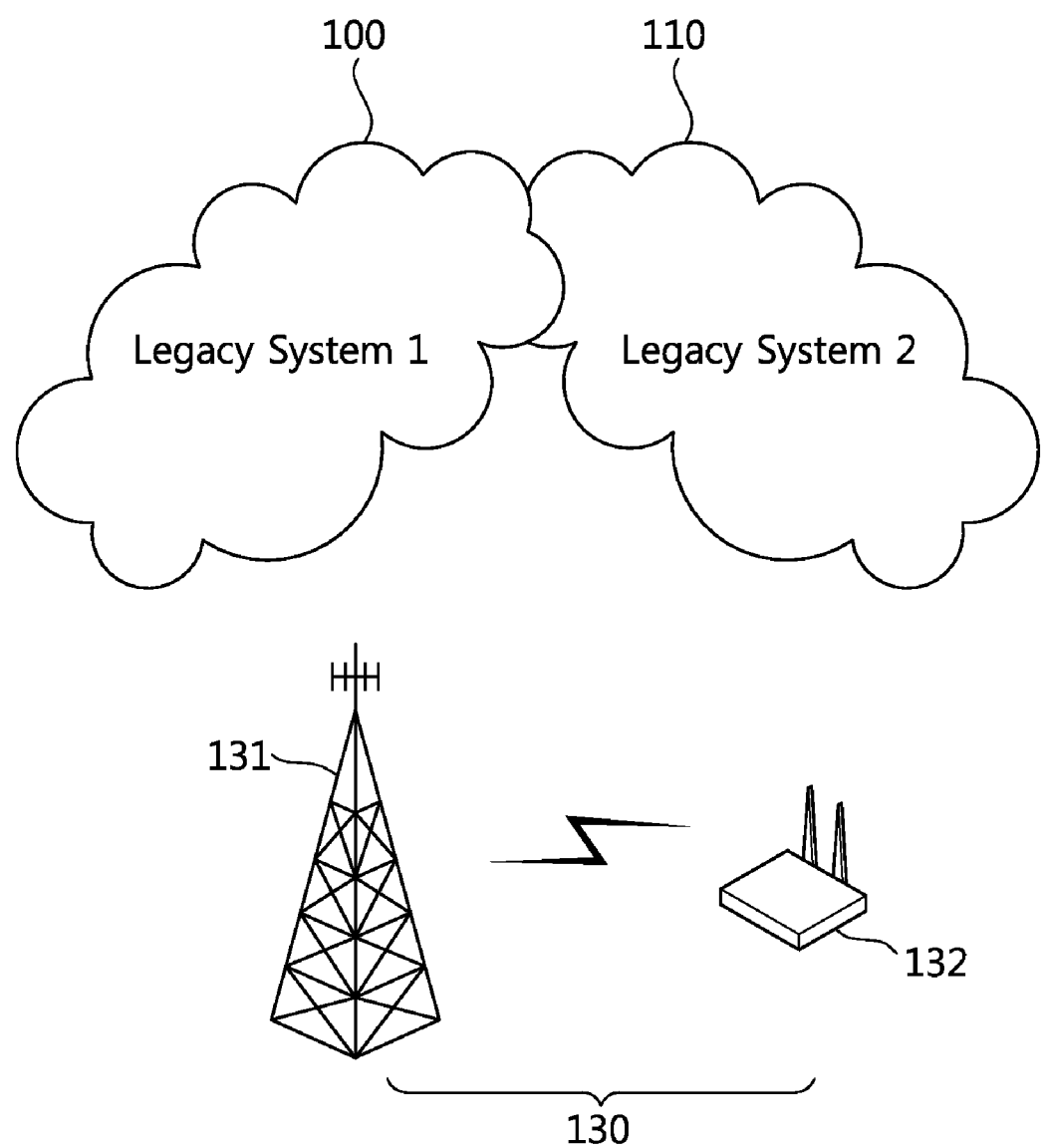
FIG. 2 shows overlay and legacy wireless communication systems.

FIG. 2 shows overlay and legacy wireless communication systems. Legacy systems 100, 110 transmit and receive data using authorized frequency bands. Although an overlay system 130 has no authority to use the frequency bands, the overlay system 130 shares frequency bands with the legacy systems 100, 110 when the signals of the overlay system 130 gives no interference the signals of the legacy systems 100, 110. To minimize interference, the overlay system 130 uses a transmit waveform based on spectrum correlation of the legacy systems 100, 110. The overlay system 130 may acquire the spectrum correlation from the legacy systems 100, 110 via signaling or from sensing the spectrum of the legacy systems 100, 110.

The overlay system 130 includes a transmitter 131 and a receiver 132. In downlink transmission, the transmitter 131 may be a part of a base station and the receiver 132 may be a part of a user terminal. In uplink transmission, the transmitter 131 may be a part of a user terminal and the receiver 132 may be a part of a base station. The transmitter 132 transmits signals to the receiver 132 in the frequency band occupied or not used by the legacy systems 100, 110.

I. System Model and Problem Formulation

In this section, we describe the system model and formulate the optimization problem in the time domain.

A. System Model

Figure 3:
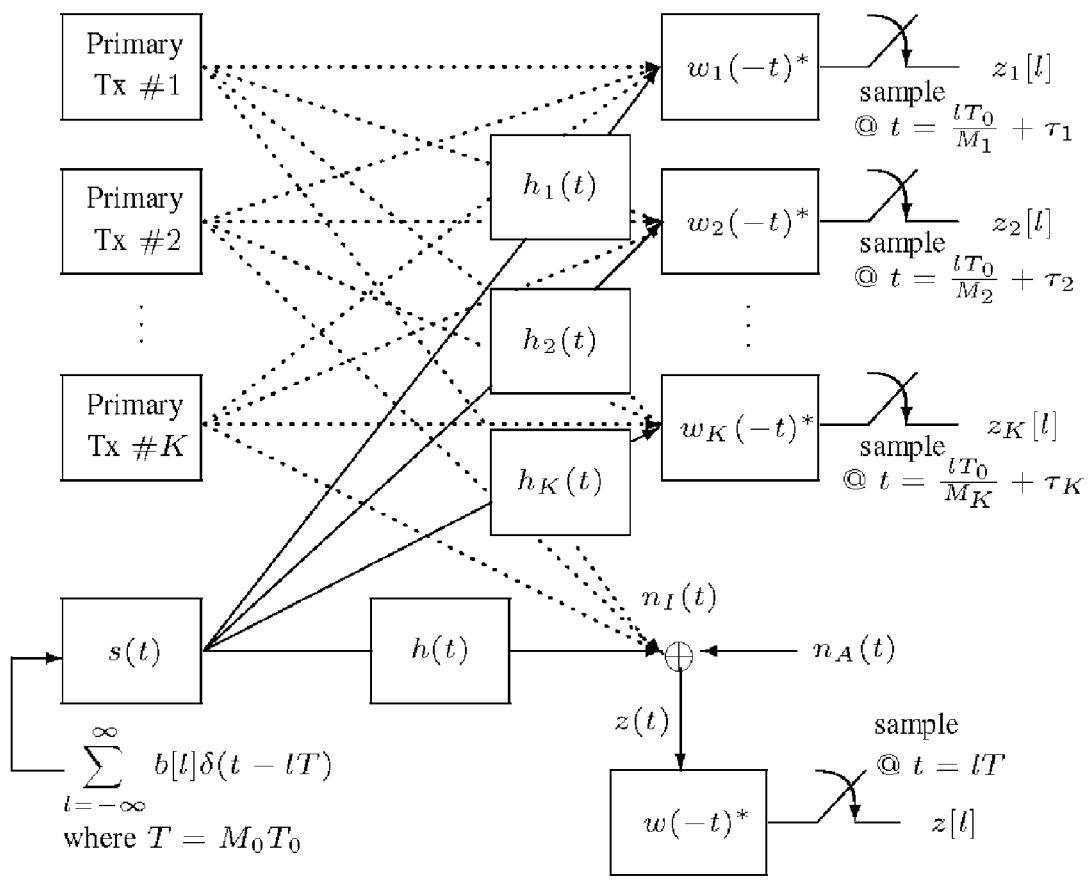
FIG. 3 shows a block diagram in complex baseband.

The system block diagram in complex baseband is depicted in FIG. 3. There are K primary users operating over the frequency band of interest. It is assumed that the overall primary-user signal is zero-mean proper-complex WSCS with fundamental cycle period $T_0$ [sec]. It is also assumed that the kth primary Rx employs a linear filter front-end with impulse response $w_k(-t)^*$, for $k \in \mathcal{K}$ where the superscript * denotes complex conjugation and $\mathcal{K} \triangleq \{1,2,\ldots,K\}$ denotes the index set of the primary users. The sequence of decision statistics $(z_k[l])_l$ at the kth primary Rx, for $\mathcal{K} \triangleq \{1,2,\ldots,K\}$, is obtained by sampling the filter output at every $T_0/M_k$ [sec] with offset $\tau\_k \in [0, T_0/M_k)$, where $M_k$ is a positive integer. For example, suppose that there are two primary users employing linear modulation with symbol periods $T_1$ and $T_2$ ($=2T_1/3$), respectively, and that their linear filter outputs are oversampled by a factor of two. Then, we have $T_0=2T_1=3T_2$, $M_1=4$, and $M_2=6$.

A secondary user that employs linear modulation with symbol transmission rate 1/T [symbols/sec] is to be designed. It is assumed that the symbol period $T(=M_0 T_0)$ is an integer multiple of $T_0$. The impulse response of the transmit filter is denoted by s(t), and that of the receive filter is denoted by $w(-t)^*$. Thus, the input to the channel is $\Sigma_{l=-\infty}^{\infty} b[l] \delta(t-lT) \otimes s(t) = \Sigma_{l=-\infty}^{\infty} b[l] s(t-lT)$, where $\delta(t)$ denotes the Dirac delta function and $\otimes$ denotes convolution. The channel from the secondary transmitter (Tx) to the secondary receiver (Rx)

is assumed to be very slowly time-varying relatively to the data transmission rate. So, it is modeled as a linear time-invariant filter with impulse response h(t). The data sequence $(b[l])_l$ of the secondary user is assumed to be a proper-complex zero-mean wide-sense stationary (WSS) colored random process with auto-correlation function $$m[l] \triangleq \mathbb{E}\{b[l+l']b[l']^*\} \quad (1)$$

and power spectral density (PSD)

$$M(f) \triangleq \sum_{l=-\infty}^{\infty} m[l] e^{-j2\pi f l}, \quad (2)$$

where $\mathbb{E}\{\cdot\}$ denotes expectation. It is also assumed that the secondary-user signal is uncorrelated with the primary-user signals.

The input z(t) to the secondary Rx is the signal from the secondary Tx plus the interference $n_I(t)$ from the K primary users, corrupted by an ambient noise $n_A(t)$. The ambient noise is modeled as a proper-complex additive white Gaussian noise (AWGN) with two-sided PSD $N_0$. Thus, z(t) can be written as $$z(t) = \sum_{l=-\infty}^{\infty} b[l] p(t - lT) + n(t), \quad (3)$$

where $p(t) \triangleq h(t) \otimes s(t)$ is the response of the channel to the transmit waveform s(t), and n(t) is the overall interference-plus-noise process given by $$n(t) \triangleq n_I(t) + n_A(t). \quad (4)$$

The sequence of decision statistics $(z[l])_l$ is, then, obtained as $$z[l] \triangleq z(t) \otimes w(-t)^* |_{t=lT} \quad (5)$$

by sampling the receive filter output at every T [sec]. Without loss of generality, we set the sampling offset at the secondary receiver to zero.

B. Problem Formulation in Time Domain

The objective is to find the secondary user's transmit and receive waveforms s(t) and w(t) that jointly minimize the MSE $$\epsilon \triangleq \mathbb{E}\{|b[l]-z[l]|^2\} \quad (6)$$

at the output sequence $(z[l])_l$, given a frequency band over which the secondary user can transmit the signal. Note that the MSE (6) is uniquely defined regardless of the value of l. This is because both the primary-user and the secondary-user signals are WSCS with the common cycle period of T.

There are two major constraints imposed on this optimization problem. The first constraint is on the average transmit power of the secondary user. Due to the cyclostationarity of the transmitted signal with cycle period T, the average transmit power $\bar{P}$ can be defined as $$\bar{P} \triangleq \mathbb{E}\left\{\frac{1}{T}\int_{\langle T \rangle} \left|\sum_{l=-\infty}^{\infty} b[l]s(t-lT)\right|^2 dt\right\}, \quad (7)$$

where $\langle T \rangle$ denotes any integration interval of length T. Thus, the constraint can be written as $\bar{P}=A$ for some $A>0$.

The second constraint is on the amount of interference induced to the primary receivers. As mentioned already, we adopt the zero interference constraint at the output samples of the linear filter front-ends of the primary users. The channel from the secondary Tx to the kth primary Rx, for $k \in \mathcal{K}$, is modeled as a linear time-invariant filter with impulse response $h_k(t)$. Then, for each $k \in \mathcal{K}$, the decision statistic $z_k[l]$ at the kth primary Rx has the interference component $\hat{z}_k[l]$ from the secondary user, given by $$\hat{z}_k[l] \triangleq \sum_{l'=-\infty}^{\infty} b[l'] q_k\left(\frac{lT}{M_0 M_k} - l'T\right), \quad (8)$$

where the waveform $q_k(t)$ is defined as $$q_k(t) \triangleq w_k(-t-\tau_k)^* \otimes (s(t) \otimes h_k(t)) \quad (9a)$$
$$\triangleq w_k(-t-\tau_k)^* \otimes p_k(t) \quad (9b)$$

to absorb the effect of the sampling offset $\tau_k$. Thus, the constraint can be written as $\hat{z}_k[l]=0$, $\forall k \in \mathcal{K}$ and $\forall l \in \mathbb{Z}$, where $\mathbb{Z}$ denotes the set of all integers.

In summary, the optimization problem is given by

Problem 1:

$$\underset{s(t),w(t)}{\text{minimize}}\, \mathbb{E}\{|b[l] - z[l]|^2\} \quad (10a)$$

$$\text{subject to } \mathbb{E}\left\{\frac{1}{T}\int_{\langle T \rangle}\left|\sum_{l=-\infty}^{\infty} b[l]s(t-lT)\right|^2 dt\right\} = A, \quad (10b)$$

$$\sum_{l'=-\infty}^{\infty} b[l'] q_k\left(\frac{lT}{M_0 M_k} - l'T\right) = 0, \forall k \in \mathcal{K}, \forall l \in \mathbb{Z}, \quad (10c)$$

which is to be solved under the assumption of perfect knowledge on the impulse responses h(t), $(h_k(t))_k$, and $(w_k(t))_k$ of the channels and the receive filters. Of course, there are additional constraints, which must be described in the frequency domain. These are the piecewise smoothness constraint on the Fourier transforms of s(t) and w(t), and the bandwidth constraint. The piecewise smoothness constraint is imposed to enable the Fourier transform and to eliminate pathological functions. The bandwidth constraint is discussed in detail in the next section.

II. Problem Reformulation

In this section, Problem 1 described in the time domain is reformulated. Using the VFT technique, the objective function (10a) and the constraints (10b) and (10c) are rewritten in the frequency domain. To allow non-identical frequency bands for the signal transmission and reception of the secondary user, the notions of transmit band, receive band, and virtual primary Rx are also introduced.

A. Conversion to Frequency Domain Problem

The system employs a linear modulation and the received signal is corrupted by an additive WSCS noise, where the fundamental cycle frequency is equal to the symbol transmission rate of the system. The transmit and the receive waveforms are designed to minimize the MSE at the output of a linear receiver, subject to the average transmit power constraint. Not the ordinary Fourier transform but a special transformation technique called the VFT is used to handle the additive WSCS noise. This VFT technique plays a key role to reformulate and solve Problem 1. To proceed, we need the following definitions.

Definition 1: Given a communication system with bandwidth B [Hz] in complex baseband and data symbol transmission rate 1/T [symbols/sec], the excess bandwidth β is defined by the relation $$BT = \frac{(1+\beta)}{2}. \quad (11)$$

If a linear modulation is employed in the system, then the excess bandwidth is the ratio of the extra amount of bandwidth used in the signaling to the Nyquist minimum bandwidth for zero intersymbol interference. As shown below, this parameter is closely related to the signal dimension in the frequency domain.

Definition 2: Let x(t) be a time function with Fourier transform $X(\xi) \triangleq \int_{-\infty}^{\infty} x(t) e^{-j2\pi\xi t} dt$ and bandwidth B [Hz] in complex baseband. Then, its VFT $x(f)$ with sampling rate T [samples/Hz] is defined as $$x(f) \triangleq \begin{bmatrix} X\left(-\frac{L}{T}+f\right) \\ X\left(-\frac{L-1}{T}+f\right) \\ \vdots \\ X\left(\frac{L}{T}+f\right) \end{bmatrix} \quad (12)$$

$f \in \mathcal{F}$, where the integer L is defined as $L \triangleq \lceil \beta/2 \rceil = \lceil (2BT-1)/2 \rceil$ and the Nyquist interval $\mathcal{F}$ is defined as $$\mathcal{F} \triangleq \left\{ f: -\frac{1}{2T} \leq f < \frac{1}{2T} \right\}. \quad (13)$$

Some of the entries in $x(f)$ at specific values of $f$ are always zero due to the bandwidth limitation of x(t) to B [Hz], which requires the following refinement on the definition.

Definition 3:
The effective VFT of x(t) is defined as a variable-dimensional function of $f$, obtained by removing the first entry of $x(f)$ for $$-\frac{1}{2T} \leq f < -\frac{1+\beta}{2T} + \frac{L}{T} \quad (14a)$$

and the last entry of $x(f)$ for $$\frac{1+\beta}{2T} - \frac{L}{T} \leq f < \frac{1}{2T}. \quad (14b)$$

For convenience, we define the degree of freedom as follows.

Definition 4: The degree of freedom $N(f)$ as a function of $f \in \mathcal{F}$ is defined as the dimension of the effective VFT at offset $f$.

The degree of freedom $N(f)$, thus, means the number of free variables in the signal design at the frequency offset $f$. In what follows, all VFTs are effective ones. It can be shown that the rules (14a) and (14b) lead to $$N(f) = \begin{cases} 1 + \lceil \beta \rceil, & \text{for } |f| < \frac{1+\beta-\lceil\beta\rceil}{2T} \\ \lceil \beta \rceil, & \text{otherwise} \end{cases} \quad (15a)$$

when $\lceil \beta \rceil$ is an even number, and $$N(f) = \begin{cases} \lceil \beta \rceil, & \text{for } |f| < \frac{\beta-\lceil\beta\rceil}{2T} \\ 1 + \lceil \beta \rceil, & \text{otherwise} \end{cases} \quad (15b)$$

when $\lceil \beta \rceil$ is an odd number. Note that the parameter β determines the signal dimension at each $f \in \mathcal{F}$.

Now, we are ready to convert Problem 1 to an equivalent problem described in the frequency domain. First, we convert the objective function (10a). For this, the MSE at the output of the secondary Rx is rewritten as $$\epsilon = \mathbb{E}\{|b[l]|^2\} - 2\Re \mathbb{E}\{b[l]^* z[l]\} + \mathbb{E}\{|z[l] - n[l]|^2\} + \mathbb{E}\{|n[l]|^2\}, \quad (16)$$

where the noise component n[l] is defined as $$n[l] = \int_{-\infty}^{\infty} w(t - lT)^* n(t) dt. \quad (17)$$

Each term in (16) can be rewritten as $$\mathbb{E}\{|b[l]|^2\} = \int TM(fT) df, \quad (18a)$$

$$-2\Re(\mathbb{E}\{b[l]^* z[l]\}) = -2\Re \int (w(f)^H (M(fT)p(f))) df, \quad (18b)$$

$$\mathbb{E}\{|z[l] - n[l]|^2\} = \int w(f)^H \left(\frac{M(fT)}{T} p(f)p(f)^H\right) w(f) df, \quad (18c)$$

and $$\mathbb{E}\{|n[l]|^2\} = \int w(f)^H R_N(f) w(f) df, \quad (18d)$$

respectively, where $w(f)$, $p(f)$ and $R_N(f)$ are the VFT of the receive waveform w(t), the VFT of the channel response p(t) of the transmit waveform, and the matrix-valued PSD of the WSCS noise n(t), respectively. The (k,l)th entry of the matrix-valued PSD $R_N(f)$ can be obtained as $$[R_N(f)]_{k,l} \triangleq \begin{cases} R_N^{(k-l)}\left(f + \frac{l-L-1}{T}\right), & \text{for } |k-l| \leq 2L \\ 0, & \text{elsewhere} \end{cases} \quad (19)$$

where $R_N^{(k)}(\xi)$ and the double Fourier transform $R_N(\xi,\tilde{\xi})$ of $\mathbb{E}\{N(t)N(s)^*\}$ satisfy the relation $$R_N(\xi,\tilde{\xi}) = \sum_k R_N^{(k)}\left(\xi - \frac{k}{T}\right) \delta\left(\xi - \tilde{\xi} - \frac{k}{T}\right). \quad (20)$$

Note that, due to the ambient noise component in n(t), the matrix $R_N(f)$ is positive definite $\forall f \in \mathcal{F}$. If we further define $R_Z(f)$ as the matrix-valued PSD of the received signal $z(t)$, then it can be shown that $R_Z(f)$ is given by $$R_Z(f) \triangleq R_N(f) + \frac{1}{T}M(fT)p(f)p(f)^H \quad (21)$$

and, consequently, the MSE (6) can be simplified as $$\varepsilon = \int_{\mathcal{F}} TM(fT) + w(f)^H R_Z(f)w(f) - 2\Re(w(f)^H(M(fT)p(f)))df \quad (22)$$

Second, we convert the average power constraint (10b) as $$\int_{\mathcal{F}} \frac{M(fT)}{T} s(f)^H s(f) df = A \quad (23)$$

Third, we convert the zero interference constraint (10c) to an orthogonality constraint, as shown in the following lemma. For this, let $e_{k,l}(f)$ for $k \in \mathcal{K}$ and $l \in \{0,1,\ldots,M_0M_k-1\}$ be a variable-length vector-valued function of $f \in \mathcal{F}$ defined as $$e_{k,l}(f) \triangleq \begin{bmatrix} e^{j2\pi\left(\frac{l}{M_0M_k}+\frac{\tau_k}{T}\right)\cdot 1} \\ e^{j2\pi\left(\frac{l}{M_0M_k}+\frac{\tau_k}{T}\right)\cdot 2} \\ \vdots \\ e^{j2\pi\left(\frac{l}{M_0M_k}+\frac{\tau_k}{T}\right)\cdot N(f)} \end{bmatrix} \quad (24)$$

and let $\odot$ denote the entry-by-entry Hadamard product.

Lemma 1: The zero interference constraint (10c) can be expressed as an orthogonality constraint $$\sqrt{m(fT)}\, w_{k,l}(f)^H H_k(f) s(f) = 0, \forall f \in \mathcal{F}, \quad (25)$$

$$\forall k \in \mathcal{K},$$

$$\forall l \in \{0,1,\ldots,M_0M_k-1\}$$

on $s(f)$, where $w_{k,l}(f)$ is defined as $$w_{k,l}(f) \triangleq w_k(f) \odot e_{k,l}(f) \quad (26)$$

with $w_k(f)$ being the VFT of $w_k(t)$, $$H_k(f) \triangleq \text{diag}(h_k(f)) \quad (27)$$

is the $N(f)$-by-$N(f)$ diagonal matrix with $h_k(f)$ being the VFT of $k_k(t)$, and $s(f)$ is the VFT of $s(t)$.

Finally, Problem 1 described in the time domain can be transformed to

Problem 2:

$$\underset{s(f),w(f)}{\text{minimize}}\, TM(fT) + \quad (28a)$$

$$w(f)^H R_Z(f)w(f) - 2\Re(w(f)^H(M(fT)p(f)))df$$

subject to $$\sqrt{M(fT)}\, w_{k,l}(f)^H H_k(f) s(f) = 0, \quad (28b)$$

$$\forall f \in \mathcal{F}, \forall k \in \mathcal{K},$$

$$\forall l \in \{0,1,\ldots,M_0M_k-1\},$$

$$\int_{\mathcal{F}} \frac{M(fT)}{T} s(f)^H s(f) df = A, \quad (28c)$$

which is now described in the frequency domain. At a first glance, the next step is to directly tackle Problem 2 to find an optimal solution, after checking the existence of a solution. However, there is a subtlety that needs to be discussed, due to the possible difference in bandwidths of the transmit waveform $s(t)$ and the receive waveform $w(t)$. This issue is dealt with in detail in the next subsection.

B. Transmit Band, Receive Band, and Virtual Primary Receivers

In order to use the VFT technique in the optimization, the center frequency used in the complex baseband down-conversion and the bandwidth B used in the vectorization (12) need to be determined first. To proceed, we introduce the following two definitions.

Definition 5: The transmit band $\mathcal{W}_T \triangleq \{\xi: W_{T,0} \leq |\xi| \leq W_{T,1}\}$ is defined as a frequency band where the secondary Tx can transmit a signal.

Definition 6: The receive band $\mathcal{W}_R \triangleq \{\xi: W_{R,0} \leq |\xi| \leq W_{R,1}\}$ is defined as a frequency band where the secondary Rx can receive and process the signal.

Then, there are three cases worth considering in the cognitive radio design: 1) Both $\mathcal{W}_T$ and $\mathcal{W}_R$ are given, 2) only $\mathcal{W}_R$ is given, and 3) only $\mathcal{W}_T$ is given. Note that the optimal Tx does not allocate any signal power in the complement $\mathcal{W}_R^c$ of $\mathcal{W}_R$ because the signal component in $\mathcal{W}_R^c$ is not observed by the secondary Rx and, consequently, it cannot contribute to reducing the MSE. Thus, without loss of optimality, we re-define the transmit band as $\mathcal{W}_T \cap \mathcal{W}_R$ in case 1), and we set $\mathcal{W}_T = \mathcal{W}_R$ in case 2). In case 3), in order not to waste any transmit power, $\mathcal{W}_R$ must be chosen to include $\mathcal{W}_T$. Moreover, it is potentially suboptimal not to include a frequency band having an observable that has non-zero correlation with the observable inside $\mathcal{W}_R$. This is because the non-zero correlation can be exploited in reducing the MSE. Thus, we set $W_{R,0}(\leq W_{T,0})$ and $W_{R,1}(\geq W_{T,1})$, respectively, as the maximum and the minimum values of frequencies such that the observable inside $\mathcal{W}_R$ has no correlated observable outside $\mathcal{W}_R$, where $W_{R,0}$ and $W_{R,1}$ are assumed finite. In all three cases, the transmit band is now contained in the receive band. So, it is convenient to choose the center frequency of $\mathcal{W}_R$ as the reference for complex baseband representation and the baseband bandwidth of $\mathcal{W}_R$ as the bandwidth B for the vectorization.

If the transmit band is a proper subset of the receive band, then constraints additional to the zero interference constraint (28b) must be imposed on $s(t)$, otherwise the secondary user may emit signal power in $\mathcal{W}_R \setminus \mathcal{W}_T \triangleq \mathcal{W}_R \cap \mathcal{W}_T^c$. To handle this situation, we introduce the notion of a virtual primary Rx, where and in what follows $\mathcal{B}_T$ and $\mathcal{B}_R$ are the transmit and the receive bands in complex baseband, respectively, and $\mathcal{B}_H$ is the support of the channel frequency response $H(\xi)$ between the secondary Tx and the secondary Rx, i.e., $$\mathcal{B}_H \triangleq \{\xi: H(\xi) \neq 0\}. \quad (29)$$

Definition 7: The lth virtual primary Rx, for $l = -L, -L+1, \ldots, L$, is defined as a fictitious primary Rx that has the linear filter front-end with frequency response $$\hat{W}_1(\xi) = \begin{cases} 1_{B_R \setminus (B_T \cap B_H)}(\xi), & \text{for } \frac{2l-1}{2T} \leq \xi < \frac{2l+1}{2T} \\ 0, & \text{elsewhere}, \end{cases} \quad (30)$$

and sampling rate $1/T$, where $1_{\{\cdot\}}(\xi)$ denotes the indicator function.

As we do not allow any secondary-user signal component existing at the sampled output of the primary receivers, the introduction of such virtual primary receivers makes the secondary Tx emit no power outside the transmit band. Just to serve this purpose only, the index set $\mathcal{B}_R \setminus (\mathcal{B}_T \cap \mathcal{B}_H)$ in (30) appears excessive and can be simplified to $\mathcal{B}_R \setminus \mathcal{B}_T$. However, we define a virtual primary Rx as Definition 7 because this definition makes the argument much simpler on the necessary and sufficient condition for the existence of the optimal solution, which will be discussed in Section IV-B. Note that this modification of the index set does not result in any loss of optimality, because the optimal secondary transmitter never emits signal in the frequency band $\mathcal{B}_R \setminus \mathcal{B}_H$ otherwise the signal component in $\mathcal{B}_R \setminus \mathcal{B}_H$ is completely nulled out by the channel and, consequently, the energy in the band is wasted without contributing to minimizing the MSE.

Example 1

Figure 4:
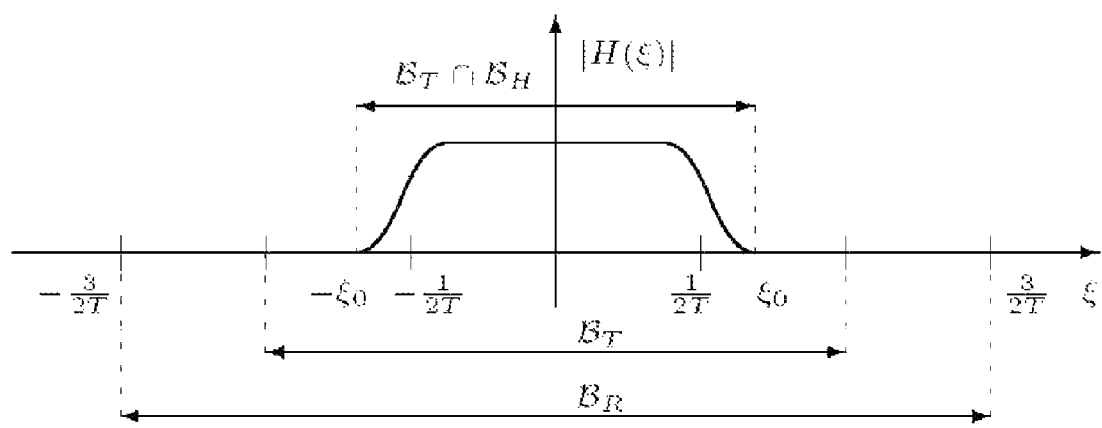
FIG. 4 shows an example of transmit band, receive band, and frequency response.

Suppose that $\mathcal{B}_T$, $\mathcal{B}_R$, and $H(\xi)$ are given as illustrated in FIG. 4. Then, there are two virtual primary receivers with non-zero frequency responses given by $\hat{W}_{-1}(\xi) = 1$, for $-\frac{3}{2T} \leq \xi < -\xi_0$, $\hat{W}_1(\xi) = 1$, for $\xi_0 \leq \xi < \frac{3}{2T}$, and zero, elsewhere. Thus, their VFTs are given by $$\hat{w}_{-1}(f) = \begin{cases} [1 \ 0 \ 0]^H, & \text{for } -\frac{1}{2T} \leq f < -\xi_0 + \frac{2}{2T}, \\ [0 \ 0 \ 0]^H, & \text{for } -\xi_0 + \frac{2}{2T} \leq f < \frac{1}{2T}, \end{cases} \quad (31a)$$

$$\hat{w}_1(f) = \begin{cases} [0 \ 0 \ 0]^H, & \text{for } -\frac{1}{2T} \leq f < \xi_0 - \frac{2}{2T}, \\ [0 \ 0 \ 1]^H, & \text{for } \xi_0 - \frac{2}{2T} \leq f < \frac{1}{2T}, \end{cases} \quad (31b)$$

In contrast to the fact that the optimal $S(\xi)$ cannot allocate energy outside the frequency band $\mathcal{B}_H$, the VFT $s(f)$ of the optimal solution can be chosen arbitrarily outside the support $\mathcal{F}_M$ of $M(fT)$ defined as $$\mathcal{F}_M \triangleq \{f \in \mathcal{F} : M(fT) \neq 0\} \quad (32)$$

This is because $s(f)$ is always accompanied by the factor $\sqrt{M(fT)}$ and, consequently, no signal component of $s(f)$ in $f \in \mathcal{F}_M^c$ is transmitted by the secondary user. Thus, the range of $f$ in the zero-interference and the transmit power constraints can be confined to $\mathcal{F}_M$ without loss of optimality.

In summary, Problem 2 can be rewritten as Problem 3:

$$\underset{s(f), w(f)}{\text{minimize}} \int_{\mathcal{F}} TM(fT) + \quad (33a)$$

$$w(f)^H R_Z(f) w(f) - 2\Re\left(w(f)^H (M(fT) p(f))\right) df$$

subject to $G(f)^H s(f) = 0, \ \forall f \in \mathcal{F}_M$, $\quad$ (33b)

$$\int_{\mathcal{F}_M} \frac{M(fT)}{T} s(f)^H s(f) df = A, \quad (33c)$$

where the matrix $G(f)$ is defined as $$G(f)^H \triangleq \begin{bmatrix} w_{1,0}(f)^H H_1(f) \\ w_{1,1}(f)^H H_1(f) \\ \vdots \\ w_{1,M_0 M_1 - 1}(f)^H H_1(f) \\ \vdots \\ w_{K,0}(f)^H H_K(f) \\ w_{K,1}(f)^H H_K(f) \\ \vdots \\ w_{K,M_0 M_1 - 1}(f)^H H_K(f) \\ \hat{w}_{-L}(f)^H \\ \hat{w}_{-L+1}(f)^H \\ \vdots \\ \hat{w}_L(f)^H \end{bmatrix} \quad (34)$$

with the VFTs $\hat{w}_l(f)$, $l = -L, -L+1, \ldots, L$, of the receive waveforms of the virtual primary receivers augmenting the orthogonality constraint (28b).

III. Optimal Solution and Its Existence

In this section, the optimal solution to Problem 3 is derived. Due to the zero interference constraint (33b), it is possible for the constraint set to be empty, which makes the problem vacuous. So, a natural question is when Problem 3 has an optimal solution. This issue of the existence of the solution is also discussed.

A. Derivation of Optimal Solution

The optimization problem Problem 3 can be rewritten in a double minimization form $$\underset{s(f)}{\text{minimize}} \left\{ \underset{w(f)}{\text{minimize}} \int_{\mathcal{F}} TM(fT) + w(f)^H R_Z(f) w(f) - \right. \\ \left. 2\Re\left(w(f)^H (M(fT) p(f))\right) df \right\} \quad (35)$$

with the constraints (33b) and (33c) being imposed not on the inner minimization but only on the outer minimization. Since the inner minimization reduces to finding the linear minimum mean-squared error (LMMSE) receiver without any constraint, the solution can be easily found as $$w_{lmmse}(f) = \frac{M(fT) R_N(f)^{-1} H(f) s(f)}{1 + \frac{M(fT)}{T} s(f)^H C(f) s(f)}, \ \forall f \in \mathcal{F}, \quad (36)$$

where $H(f)$ is the $N(f)$-by-$N(f)$ diagonal matrix defined as $$H(f) \triangleq \text{diag}(h(f)') \quad (37)$$

and C(f) is the N(f)-by-N(f) matrix-valued frequency function given by $$C(f) \triangleq H(f)^H R_N(f)^{-1} H(f) \qquad (38)$$

With this solution (36), the MSE performance is given by $$\int_{\mathcal{F}_M} TM(fT) df + \int_{\mathcal{F}_M} \frac{TM(fT)}{1 + \frac{M(fT)}{T} s(f)^H C(f) s(f)} df, \qquad (39)$$

because $w_{lmmse}(f)=0$, $\forall f \in \mathcal{F}_M^c$.

Now, the outer minimization problem reduces to finding $s(f)$ that minimizes the MSE in (39) subject to the constraints (33b) and (33c). To proceed, we define the energy density function $a(f)$ of $s(f)$ as $$a(f) \triangleq s(f)^H s(f) \qquad (40)$$

for $f \in \mathcal{F}$. Then, the constraint set can be partitioned into subsets, each of which contains all feasible $s(f)$ having the same energy density function $a(f)$. So, the outer minimization problem can be rewritten in an equivalent double minimization form Problem 4:

$$\underset{a(f)}{\text{minimize}} \begin{cases} \underset{s(f)}{\text{minimize}} & \int_{\mathcal{F}_M} \frac{TM(fT)}{1 + \frac{M(fT)}{T} s(f)^H C(f) s(f)} df \\ \text{subject to} & G(f)^H s(f) = 0, \forall f \in \mathcal{F}_M \\ & s(f)^H s(f) = a(f), \forall f \in \mathcal{F}_M \end{cases} \qquad (41)$$

$$\text{subject to } \int_{\mathcal{F}_M} \frac{M(fT)}{T} a(f) df = A$$

This shows again that an arbitrary choice of the optimal transmit waveform $s_{opt}(f)$ will do for $f \in \mathcal{F}_M^c$.

To minimize the objective function of the inner optimization problem of Problem 4, we need to find $s_{opt}(f)$ that maximizes the denominator of the integrand at each $f \in \mathcal{F}_M$. Hence, the inner optimization problem to find $s_{opt}(f)$ given $a(f)$s now reduces to a convex maximization problem Sub-Problem 1:

$$\underset{s(f)}{\text{maximize}} \, s(f)^H C(f) s(f) \qquad (42a)$$

$$\text{subject to } G(f)^H s(f) = 0, \qquad (42b)$$

$$s(f)^H s(f) = a(f), \qquad (42c)$$

which needs to be solved for each $f \in \mathcal{F}_M$.

Proposition 1: The optimal solution $s_{opt}(f)$ to Sub-Problem 1 is given by $$s_{opt}(f) = \sqrt{a(f)} v_{max}(f) e^{j\theta(f)} \qquad (43)$$

for $f \in \mathcal{F}_M$, where $\theta(f)$ can be chosen arbitrarily and $v_{max}(f)$ is the normalized eigenvector corresponding to the largest eigenvalue $\lambda_{max}(f)$ of $P(f)C(f)$ or, equivalently, $P(f)C(f)P(f)$ with $P(f)$ being defined as the projection matrix $$P(f) \triangleq I(f) - G(f)(G(f)^H G(f))^\dagger G(f)^H \qquad (44)$$
$$= I(f) - G(f)G(f)^\dagger$$

where $\dagger$ denotes the Moore-Penrose generalized inverse.

Note that every eigenvector of $P(f)C(f)$ is an eigenvector of $P(f)C(f)P(f)$ with the same eigenvalue and vice versa, because pre-multiplying $P(f)$ to $P(f)C(f)v(f)=\lambda(f)v(f)$ leads to $P(f)v(f)=v(f)$, which means $P(f)C(f)P(f)v(f)=\lambda(f)v(f)$, and pre-multiplying $P(f)$ to $P(f)C(f)P(f)v'(f)=\lambda'(f)v'(f)$ leads to $P(f)v'(f)=v'(f)$, which means $P(f)C(f)v'(f)=\lambda'(f)v'(f)$.

Using the fact that $P(f)v_{max}(f)=v_{max}(f)$ and the solution (43), the optimal objective function value of Sub-Problem 1 can be calculated as $$s_{opt}(f)^H C(f) s_{opt}(f) = a(f) v_{max}(f)^H C(f) v_{max}(f) \qquad (45a)$$
$$= a(f) v_{max}(f)^H P(f) C(f) v_{max}(f) \qquad (45b)$$
$$= a(f) \lambda_{max}(f) \qquad (45c)$$

for $f \in \mathcal{F}_M$. Thus, the outer minimization of Problem 4 to find the optimal energy allotment $a_{opt}(f)$ for $f \in \mathcal{F}_M$ becomes Sub-Problem 2

$$\underset{a(f)}{\text{minimize}} \int_{\mathcal{F}_M} \frac{TM(fT)}{1 + \frac{M(fT)}{T} \lambda_{max}(f) a(f)} df \qquad (46)$$

$$\text{subject to } \int_{\mathcal{F}_M} \frac{M(fT)}{T} a(f) df = A.$$

To find the optimal energy allotment $a_{opt}(f)$ for $f \in \mathcal{F}_M$ in Sub-Problem 2, $\mathcal{F}$ is now replaced by $\mathcal{F}_M$ and the orthogonality constraint (33b) has changed $\lambda_{max}(f)$ from the largest eigenvalue of $C(f)$ to the largest eigenvalue of $P(f)C(f)$, so that $\lambda_{max}(f)$ can be zero for some $f$. To proceed, we define the set $$\mathcal{F}_{\lambda_{max}} \triangleq \{f \in \mathcal{F} : \lambda_{max}(f) \neq 0\}, \qquad (47)$$

as the support of $\lambda_{max}(f)$.

Theorem 1: The VFTs $s_{opt}(f)$ and $w_{opt}(f)$ of the jointly optimal transmit waveform $s_{opt}(t)$ and the receive waveform $w_{opt}(t)$ as the solutions to Problem 3 are given, respectively, by $$s_{opt}(f) = \begin{cases} \sqrt{a_{opt}(f)} \, v_{max}(f) e^{j\theta(f)}, & \forall f \in \mathcal{F}_M \\ \text{arbitrary}, & \forall f \in \mathcal{F}_M^c, \end{cases} \qquad (48)$$

and $$w_{opt}(f) = \frac{M(fT) R_N(f)^{-1} H(f) s_{opt}(f)}{1 + \frac{M(fT)}{T} s_{opt}(f)^H C(f) s_{opt}(f)}, \forall f \in \mathcal{F} \qquad (49)$$

where the optimal energy allotment $a_{opt}(f)$ is given by $$a_{opt}(f) = \left[ \tilde{v}_{opt} - \sqrt{\frac{T}{M(fT) \lambda_{max}(f)}} \right]^+ \sqrt{\frac{T}{M(fT) \lambda_{max}(f)}}, \qquad (50)$$

for $f \in \mathcal{F}_M \cap \mathcal{F}_{\lambda_{max}}$ with $\tilde{v}_{opt} > 0$ being the unique solution to $$\int_{\mathcal{F}_M \cap \mathcal{F}_{\lambda_{max}}} \left[ \tilde{v}_{opt} - \sqrt{\frac{T}{M(fT)\lambda_{max}(f)}} \right]^+ \sqrt{\frac{M(fT)}{T\lambda_{max}(f)}} \, df = A \qquad (51)$$

and $[x]+ \triangleq \max(x,0)$ denoting the positive part of x, and $a_{opt}(f)=0$ for $\mathcal{F}_M \cap \mathcal{F}_{\lambda_{max}}^c$.

The solution found in Theorem 1 leads to the jointly minimized MSE $\epsilon_{opt}$ given by $$\varepsilon_{opt} = \int_{\mathcal{F}_M^c \cup \mathcal{F}_{\lambda_{max}}^c} TM(fT)df + \int_{\mathcal{F}_M \cap \mathcal{F}_{\lambda_{max}}} \frac{TM(fT)}{1 + \frac{M(fT)}{T}\lambda_{max}(f)a_{opt}(f)} df. \qquad (52)$$

This shows that the minimized MSE is a monotone non-increasing function of the average transmit power A>0, which justifies the use of the equality constraint $\overline{P}=A$ instead of the inequality constraint $\overline{P}\leq A$ in the formulation of Problem 1.

B. A Necessary and Sufficient Condition for Existence of Solution

The final question to be answered is what is the necessary and sufficient condition for the existence of a non-trivial optimal solution such that $\epsilon_{opt} < \mathbb{E}\{|b[l]|^2\} = \int_{\mathcal{F}} TM(fT)df$. In this subsection, we show that the existence of a non-trivial optimal solution can be determined solely by the orthogonality constraint (33b). To proceed, we prove the following lemma. Note that the result is not trivial because C(f) is positive semi-definite in general.

Lemma 2:

$$P(f)=0 \Leftrightarrow P(f)C(f)P(f)=0. \qquad (53)$$

Theorem 2: A non-trivial optimal solution exists if the length of the set $$\{f \in \mathcal{F}_M: \text{Dim(null space of } G(f)^H) > 0\} \qquad (54)$$

is greater than zero, where Dim(•) denotes the dimension of a subspace.

The above result provides a simple way to perform admission control without eigen-decomposing the matrix P(f)C(f) but just using the matrix G(f) that can be obtained once the frequency responses and the sampling timings of the primary and the virtual primary receivers are identified.

IV. Numerical Results

In this section, we provide numerical results that demonstrate the effectiveness of our solution in designing cognitive radios. The Monte-Carlo simulation results as well as the average BER estimates based on the conditional Gaussian approximation of the overall interference are provided. Throughout this section, the primary and the secondary users employ linear modulation with QPSK symbols, the primary transmitters have square-root raised cosine pulses as the transmit waveforms with $\gamma \in [0,1]$ denoting the roll-off factor, and the primary receivers employ matched filters matched to the transmit waveform with output sampling rate equal to the symbol rate. All the sampling offsets are set to zero, all the channels are assumed frequency flat, and all the users have the same $E_b/N_0$.

Figure 5:
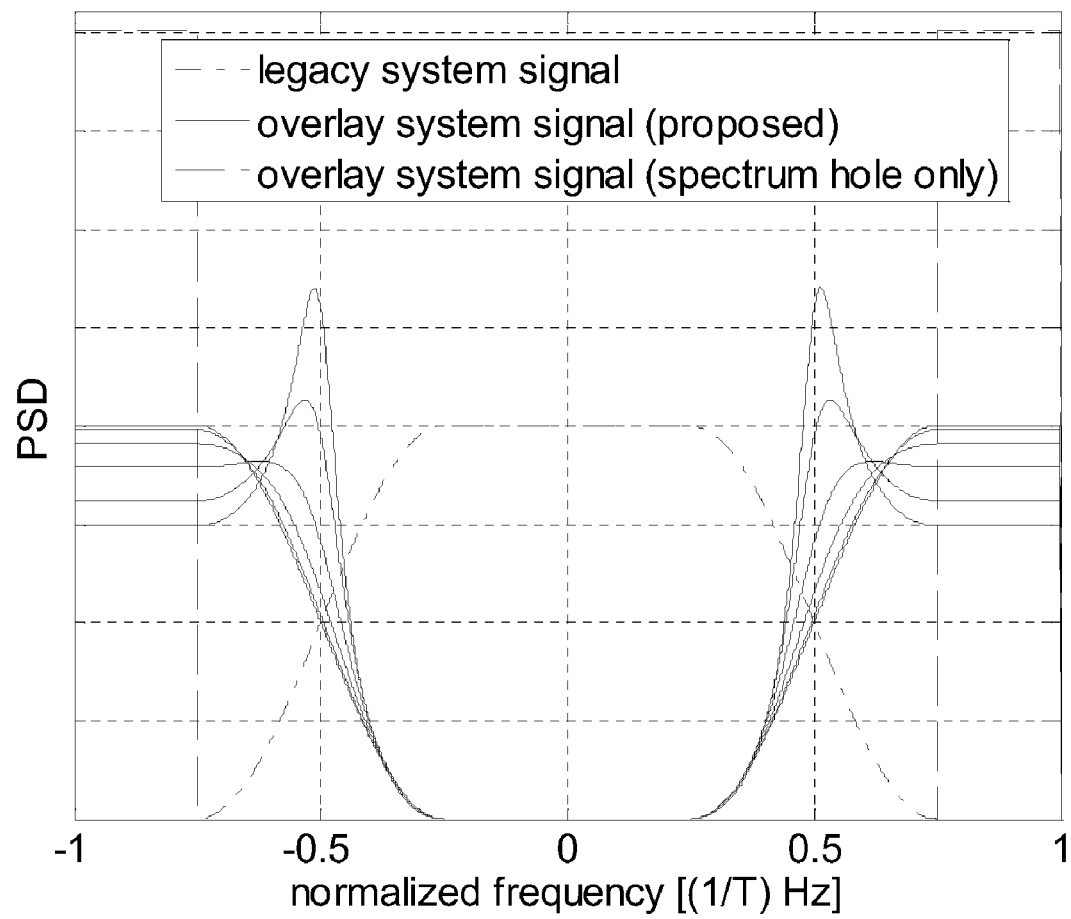
FIG. 5 shows PSDs of the signals of the overlay and legacy systems when roll-off factor equals 0.5.

The first results are to compare the performance of the proposed cognitive radio with that of the cognitive radio utilizing white space only. As illustrated in FIG. 5, there is one primary user that employs linear modulation having the symbol rate of 1/T [Hz] and a square-root raised cosine (SRRC) pulse as the transmit waveform. It is assumed that the primary and the secondary users have the identical symbol rate of 1/T [Hz], and that they both employ QPSK symbols with $E_b/N_o=10$ [dB]. It is also assumed that all the channels are ideal frequency flat channels with independent and identically distributed (i.i.d.) uniform phase and delay, and that the primary receiver employs a matched filter matched to the transmit waveform and sampled at the symbol rate. The transmit and the receive bands are chosen to be $\mathcal{B}_T=\mathcal{B}_R=[-1/T,1/T]$ [Hz]. The PSDs of the secondary user are also shown in FIG. 5, where the length of the spectrum hole is ½T or, equivalently, $\beta=0.5$, with $\beta \in [0,1]$ being the roll-off factor of the SRRC waveform of the primary transmitter. As the relative delays among the channels vary, the optimal waveform of the primary transmitter changes and, consequently, the PSD of the secondary-user signal also changes.

Figure 6:
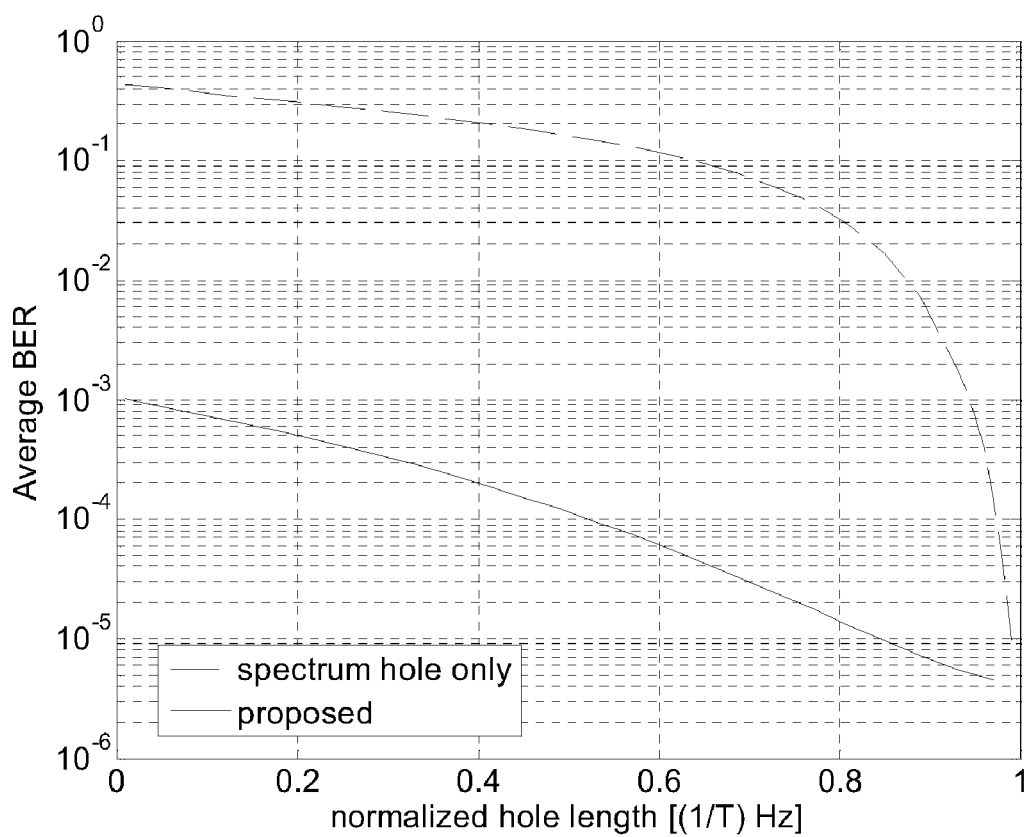
FIG. 6 shows average BER versus normalized hole length.

FIG. 6 shows the average bit error rate (BER) performance of the secondary user versus the length of the spectrum hole, which equals $(1-\beta)/T$. It can be seen that the proposed cognitive radio, enjoying the increased bandwidth, performs significantly better than the cognitive radio that utilizes the spectrum hole only. Note that the average BERs converge to the AWGN bound as the length of the spectrum hole increases to 1/T, the Nyquist minimum bandwidth for zero intersymbol interference.

Figure 7:
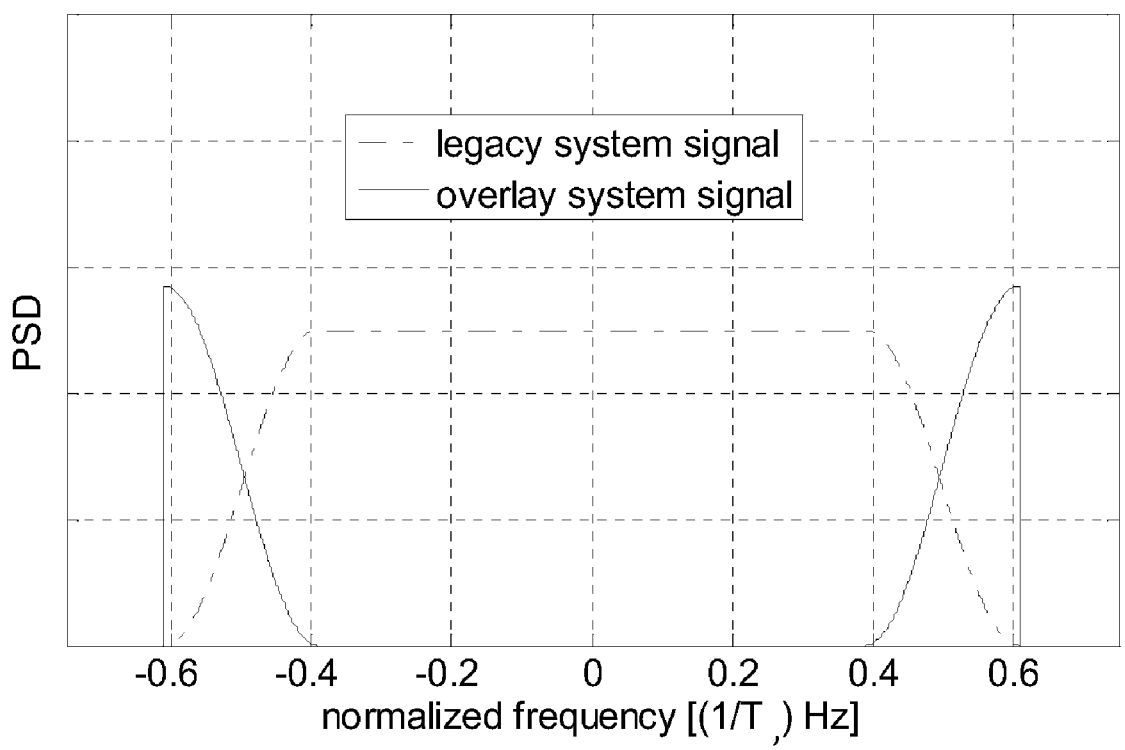
FIG. 7 shows trade-off between the average BER and the symbol rate when roll-off factor equals 0.22, and $1/T=1/(4T_0)$.
Figure 8:
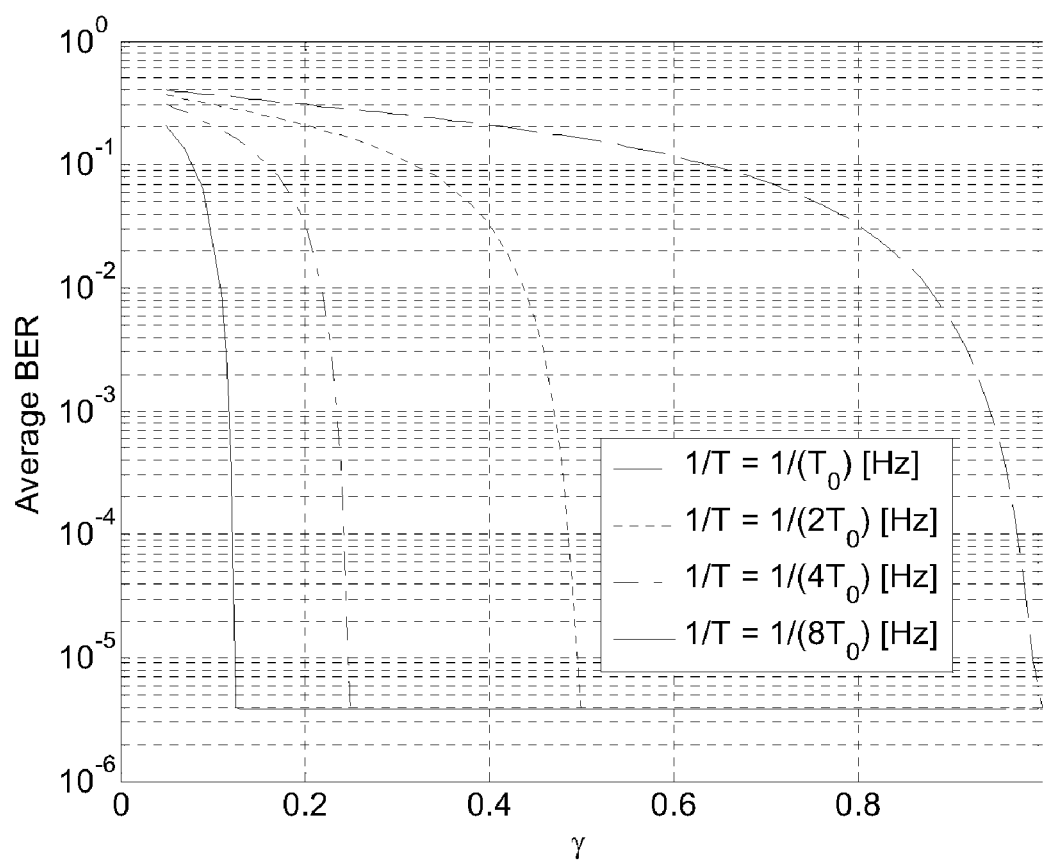
FIG. 8 shows average BER versus roll-off factor of the legacy system's square-root raised cosine (SRRC) transmitter waveform.

The next results are to show the trade-off between the average BER and the symbol rate of the secondary user, especially when there is no spectrum hole. As shown in FIG. 7, there is one primary user with the symbol rate of $1/T_0$ [Hz] and $E_b/N_0=10$ [dB]. The symbol rate 1/T of the secondary user is a fraction of $1/T_0$, and $\mathcal{B}_T=\mathcal{B}_R=[-(1+\gamma)/(2T_0), (1+\gamma)/(2T_0)]$ [Hz]. In particular, the application of the proposed cognitive radio to satellite communication is considered, where the primary and the secondary transmitters are terrestrial stations, so that both the primary- and the secondary-user signals are amplified and retransmitted by a single relay, the satellite. For simplicity, possible nonlinearity of the satellite amplifier is ignored. Since the cases with $T \neq T_0$ are also considered, the frequency is normalized with respect to $1/T_0$. As the channels are assumed flat and the propagation delays from the satellite to the primary Rx and to the secondary Rx are identical, it turns out that the optimal solution not only makes the secondary-user signal orthogonal to the primary Rx but also makes the secondary Rx to completely null out the primary-user signal. Thus, as shown in FIG. 8, the proposed scheme makes any target BER that is no less than the AWGN bound achievable by trading off the symbol transmission rate, whenever the symbol rate 1/T of the secondary user is chosen to satisfy $$\frac{T_0}{T} \leq \gamma.$$

Figure 9:
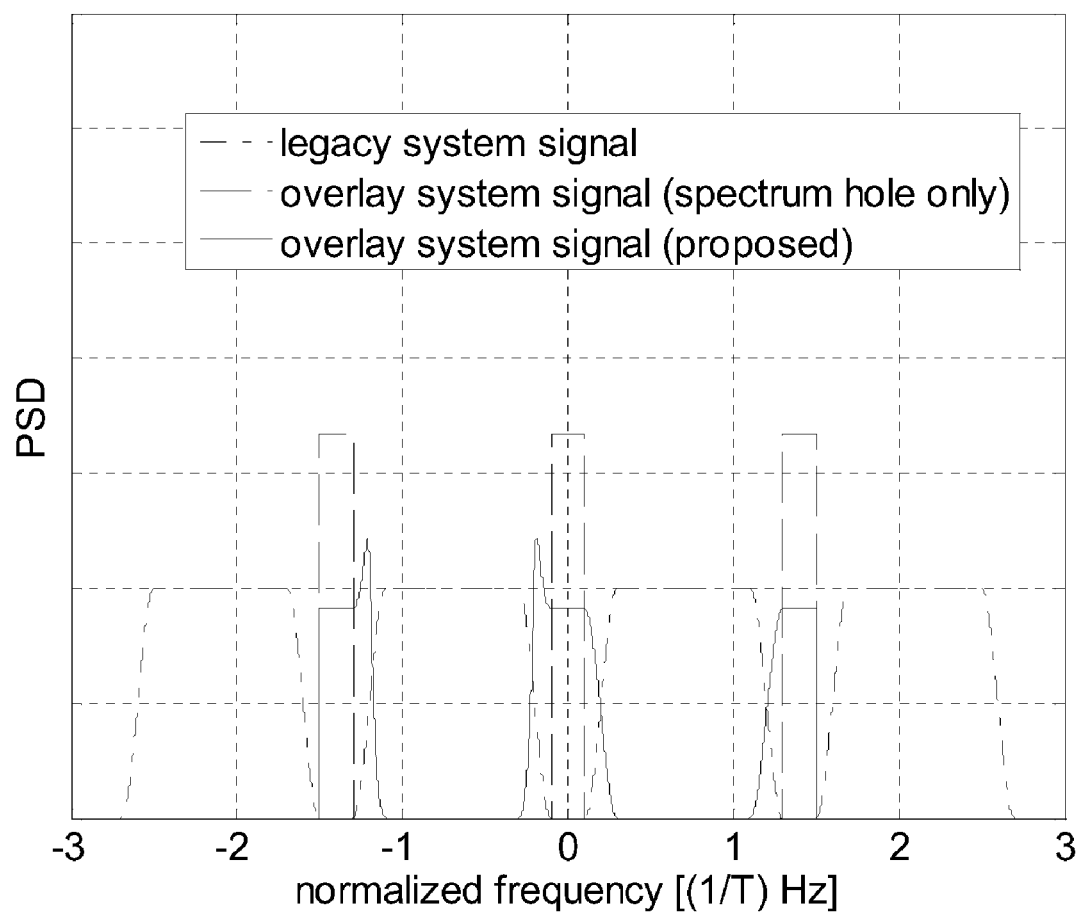
FIG. 9 shows comparison of the proposed scheme that utilizes spectrum hole only with the proposed scheme.

The final results are to compare the performance of the proposed cognitive radio with that of the cognitive radio utilizing white space only. As illustrated in FIG. 9, there are four primary users with $\gamma=0.2$, and the length of each guard band is $$\frac{0.2}{T}.$$

Figure 10:
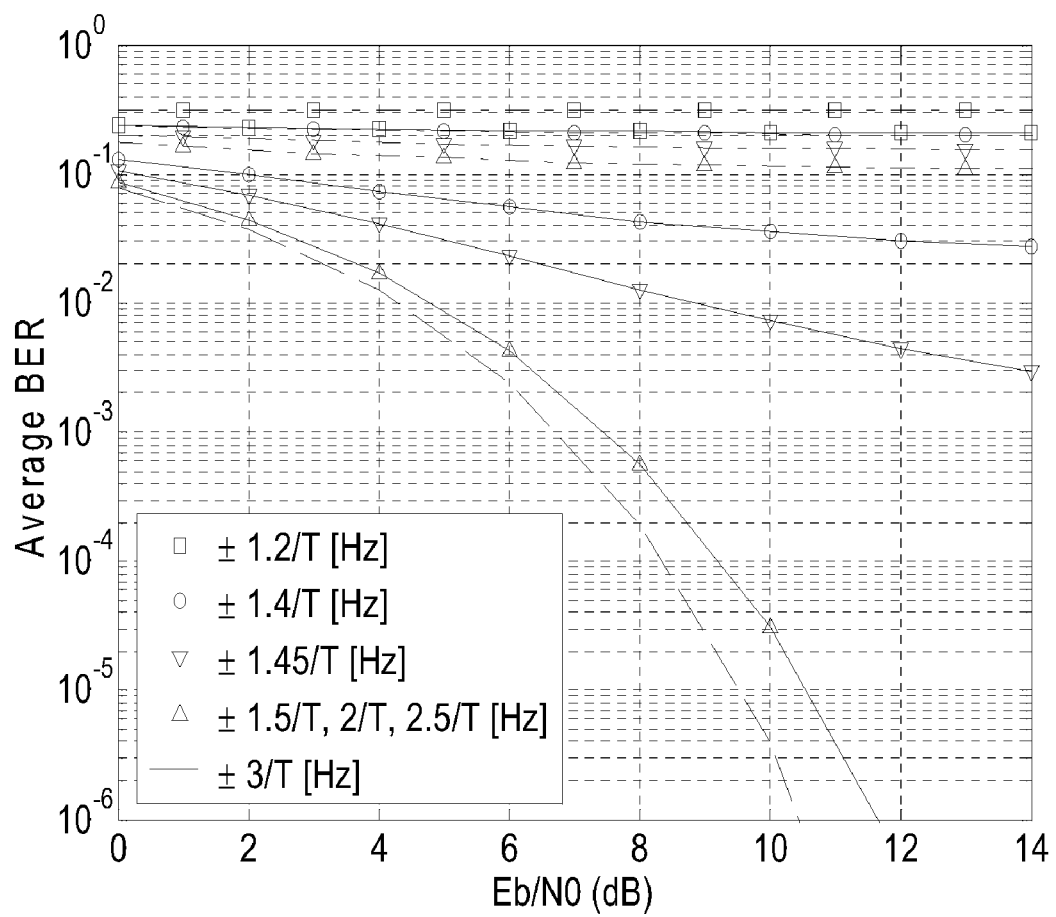
FIG. 10 shows average BER versus Eb/No for various transmit bands.

It is assumed that the channels have independent and identically distributed uniform phase and delay. The receive band is $$B_R = \left[-\frac{3}{T}, \frac{3}{T}\right],$$

and the transmit band is $$B_T = \left[-\frac{1.2}{T}, \frac{1.2}{T}\right], \left[-\frac{1.4}{T}, \frac{1.4}{T}\right],$$
$$\left[-\frac{1.45}{T}, \frac{1.45}{T}\right], \left[-\frac{1.5}{T}, \frac{1.5}{T}\right], \left[-\frac{2}{T}, \frac{2}{T}\right], \left[-\frac{2.5}{T}, \frac{2.5}{T}\right], \text{ or } \left[-\frac{3}{T}, \frac{3}{T}\right],$$

so that the length of the corresponding spectrum hole is 0.2/T, 0.4/T, 0.5/T, 0.6/T, 0.6/T, 0.6/T, or 1.2/T, respectively. To obtain the optimal solution for each transmit and receive band pair, a proper number of virtual primary receivers is introduced. FIG. 9 also shows the PSDs of the secondary-user signals when $E_b/N_0=10$ [dB], $\mathcal{B}_T=[-1.5/T,1.5/T]$, the symbol timing offset between two primary transmitters in the middle is 0.4T, and all the channel delays are zero. As shown in FIG. 10, the proposed cognitive radio, enjoying the increased bandwidth, performs significantly better than the cognitive radio that utilizes the spectrum hole only. Note that, due to the capability of the proposed scheme of utilizing some black and gray spaces, the BER performance close to the AWGN bound is easily achieved even when the length of the spectrum hole is less than 1/T, the Nyquist minimum bandwidth for zero intersymbol interference.

Figure 11:
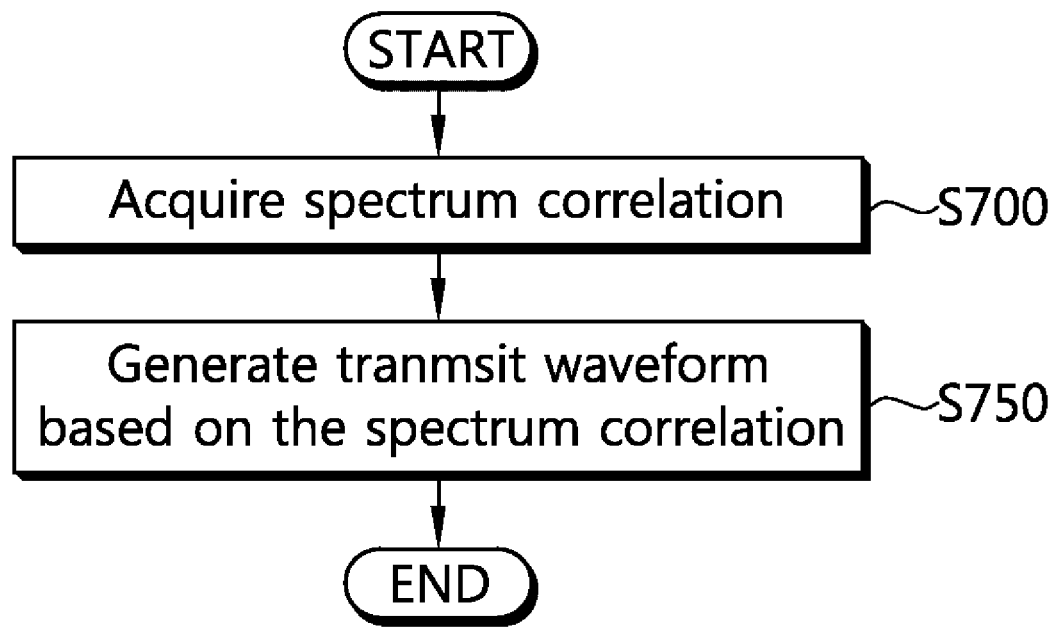
FIG. 11 shows a method of sharing spectrum with a legacy communication system according an embodiment of the present invention.

FIG. 11 shows a method of sharing spectrum with a legacy communication system according an embodiment of the present invention. The method may be performed by a transmitter of an overlay system.

Referring to FIG. 11, in S700, spectrum correlation of at least one legacy communication system is acquired. The spectrum correlation may be related to one of statistical characteristics of the legacy communication system and/or correlations of signals in the legacy communication system. The spectrum correlation is used to determine 2-dimensional power spectrum density (PSD) of the legacy communication system and is related to correlations of signals of the legacy communication system in the frequency domain. The spectrum correlation is used to determine PSD $R_N(f)$ as shown in Equation (19) and is represented as $\mathbb{E}\{N(t)N(s)^*\}$.

In S750, a transmit waveform is generated based on the spectrum correlation. A transmit signal is generated by combining the transmit waveform and a data signal and is transmitted through a radio channel. The transmit waveform may be generated by using Vectorized Fourier Transform (VFT).

The transmit waveform can directly be generated from the spectrum correlation. The transmitter may acquire the spectrum correlation from information transmitted from the legacy communication system. Alternatively, the transmitter may acquire the spectrum correlation by sensing the signals of the legacy communication system.

Figure 12:
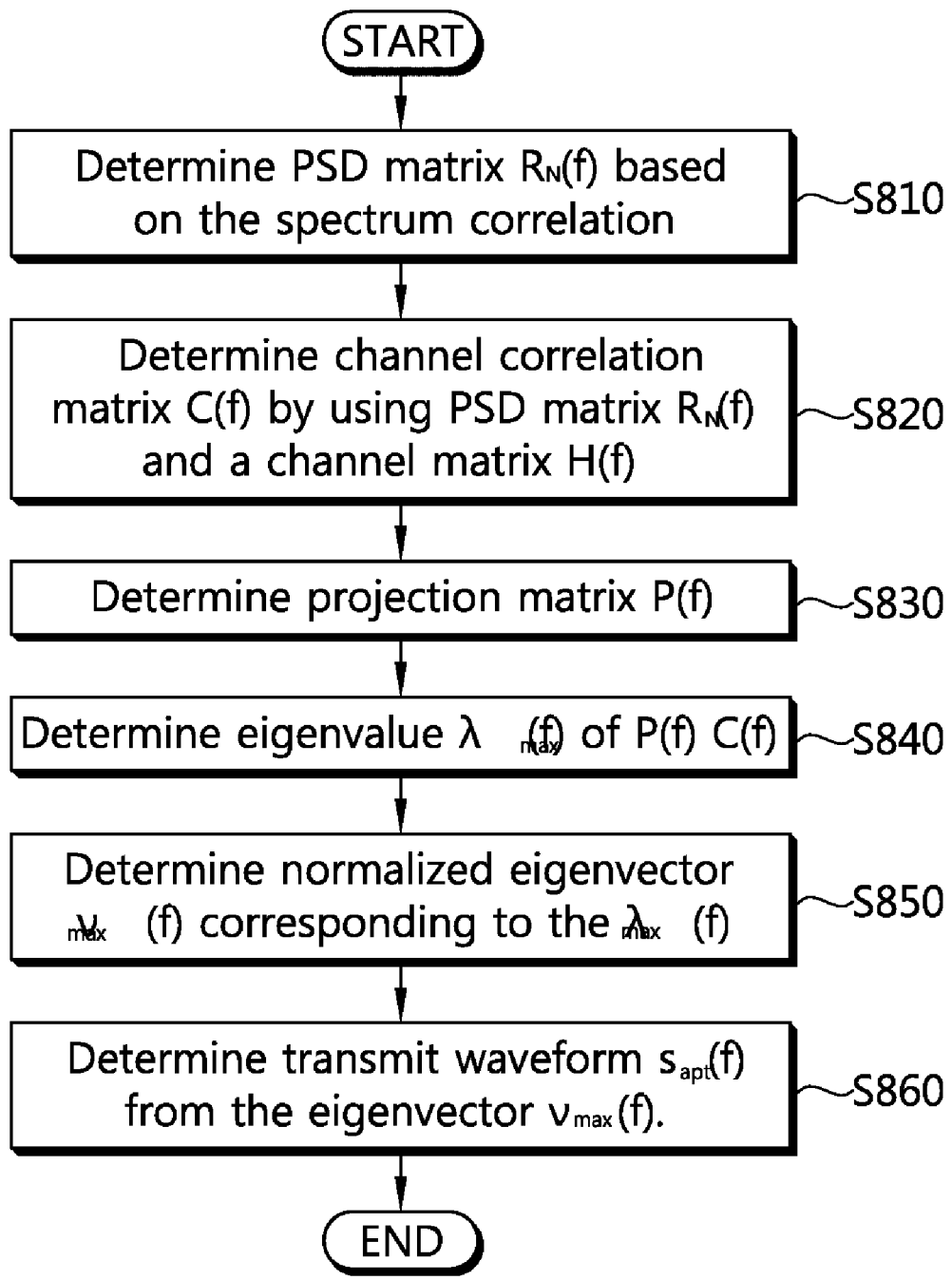
FIG. 12 shows a flowchart of generating a transmit waveform.

FIG. 12 shows a flowchart of generating a transmit waveform. In S810, a PSD matrix $R_N(f)$ is determined based on the spectrum correlation as shown in Equation (19). In S820, a channel correlation matrix $C(f)$ by using the PSD matrix $R_N(f)$ and a channel matrix $H(f)$ is determined as shown in Equation (38). In S830, a projection matrix $P(f)$ is determined as shown in Equation (44). The projection matrix $P(f)$ may be determined by using a blocking matrix $G(f)$ obtained from impulse responses of the legacy communication system. In S840, an eigenvalue $\lambda_{max}(f)$ of $P(f)C(f)$ is determined. The eigenvalue $\lambda_{max}(f)$ may be the largest eigenvalue of the $P(f)C(f)$. In S850, a normalized eigenvector $v_{max}(f)$ corresponding to the $\lambda_{max}(f)$ is determined. In S860, a transmit waveform $s_{opt}(f)$ from the eigenvector $v_{max}(f)$ is determined as shown in Equation (48).

Figure 13:
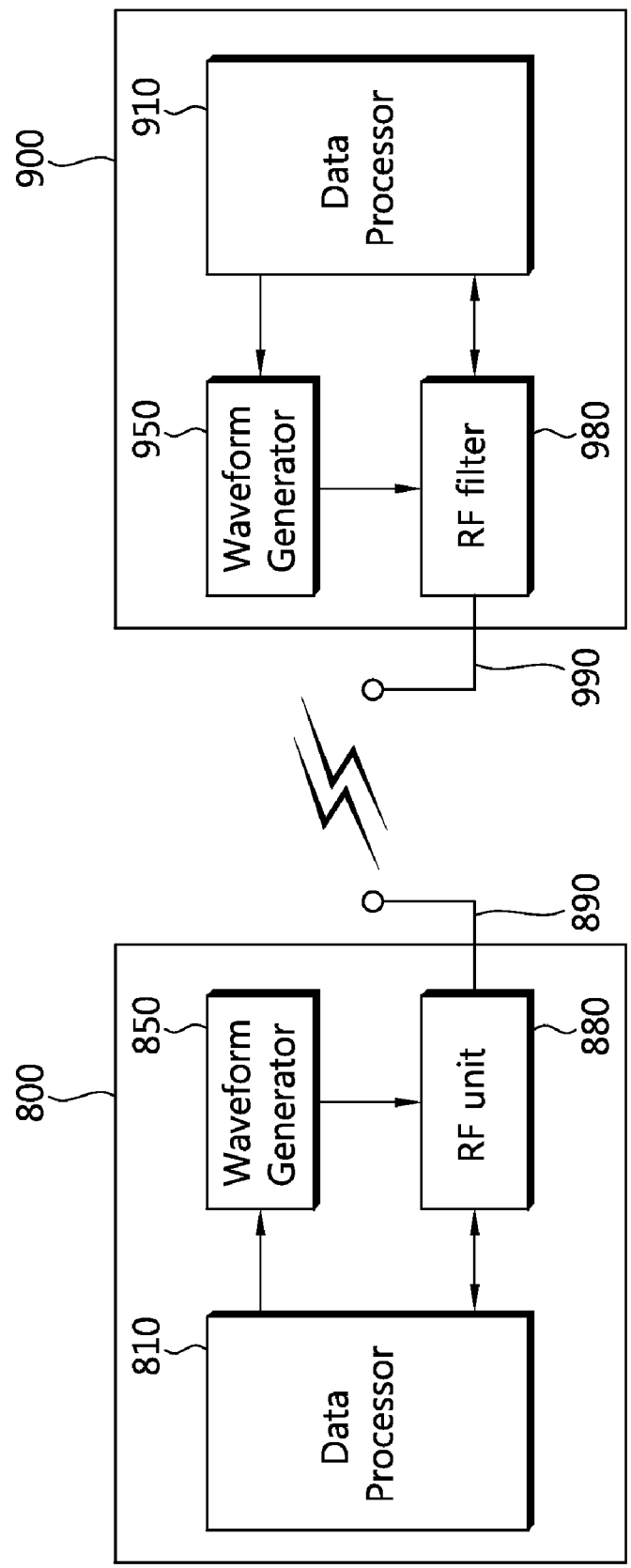
FIG. 13 shows a block diagram of a transmitter and a receiver of an overlay communication system according an embodiment of the present invention.

FIG. 13 shows a block diagram of a transmitter and a receiver of an overlay communication system according an embodiment of the present invention. A transmitter 800 includes a data processor 810, a waveform generator 850 and a Radio Frequency (RF) unit 880. The data processor 810 is configured to generate a data signal. The waveform generator 850 is configured to generate a transmit waveform based on spectrum correlation of the legacy communication system. The transmit waveform may be generated by using Vectorized Fourier Transform (VFT). The RF unit 880 is configured to transmit a radio signal based on the transmit waveform. The radio signal is generated by combining the data signal and the transmit waveform. The radio signal is transmitted through a transmit antenna 890.

A receiver 900 includes a data processor 910, a waveform generator 950 and a RF filter 980. A receive signal which is transmitted by the transmitter 800 is received through a receive antenna 990. The RF filter 980 is configured to filter the receive signal based on a receive waveform. The waveform generator 950 is configured to generate the receive waveform based on spectrum correlation of the legacy communication system. The data processor 910 reproduces data from the filtered signal. The receive waveform $w_{opt}(f)$ as shown in Equation (49) may be acquired through steps S810 to S850 in FIG. 12.

Spectrum correlation of one or more legacy communication systems may be given in various ways. Spectrum correlation may be information on PSD of the legacy communication system or information on parameter to determine the PSD of the legacy communication system.

Unlike conventional cognitive radios that utilize spectrum holes only, the proposed method can also utilize spectrally correlated frequency components where primary-user signals are present. Under fixed linear receiver assumption on the primary users, the optimal transmit and receive waveforms of the secondary user are derived that jointly minimize the MSE at the output of the linear receiver of the secondary user, subject to zero interference at the output samples of the primary receivers. Using the VFT technique, the optimal solution and the necessary and sufficient condition for the existence of the optimal solution are derived in the frequency domain. It is shown that the proposed scheme significantly improves the BER performance and the spectral efficiency without modifying the primary-user side.

All the functions described above may be performed by a processor such as a microprocessor, controller, microcontroller, application specific integrated circuit (ASIC), and the like operated based on software, a program code, or the like coded to perform the functions. A design, development, and implementation of the code will be apparent to those skilled in the art based on the description of the present invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of sharing spectrum with a legacy communication system, the method comprising:

receiving a receive waveform w(t) from the legacy communication system in a shared frequency band;

determining a Vectorized Fourier Transform (VFT) w(f) of the receive waveform which is a vector representing sampled values with a sampling rate T from the Fourier transform of the receive waveform;

determining a channel matrix H(f) and a noise with the legacy communication system;

generating a transmit waveform based on the VFT w(f) of the receive waveform, the channel matrix H(f) and the noise such that an interference with the legacy communication system is minimized under a transmission of the transmit waveform; and transmitting the transmit waveform in the shared frequency band.

2. The method of claim 1, wherein generating the transmit waveform comprises:

determining a channel correlation matrix C(f) based on the noise and the channel matrix H(f);

determining a projection matrix P(f) based on the VFT w(f) of the receive waveform and the channel matrix H(f);

determining an eigenvalue of $\lambda_{max}(f)$ of P(f)C(f);

determining a normalized eigenvector $v_{max}(f)$ corresponding to the $\lambda_{max}(f)$; and determining the transmit waveform $s_{opt}(f)$ from the e normalized igenvector $v_{max}(f)$.

3. The method of claim 2, wherein the eigenvalue $\lambda_{max}(f)$ is the largest eigenvalue of the P(f)C(f).

4. A transmitter for sharing spectrum with a legacy communication system, comprising:

a waveform generator for generating a transmit waveform in a shared frequency band; and a Radio Frequency (RF) unit for transmitting the transmit waveform, wherein the waveform generator is configured to:

receive a receive waveform w(t) from the legacy communication system in the shared frequency band;

determine a Vectorized Fourier Transform (VFT) w(f) of the receive waveform which is a vector representing sampled values with a sampling rate T from the Fourier transform of the receive waveform; and determine a channel matrix H(f) and a noise with the legacy communication system;

generate the transmit waveform based on the VFT w(f) of the receive waveform, the channel matrix H(f) and the noise such that an interference with the legacy communication system is minimized under a transmission of the transmit waveform.

5. The transmitter of claim 4, wherein the waveform generator is configured to generate the transmit waveform by:

determining a channel correlation matrix C(f) based on the noise and the channel matrix H(f);

determining a projection matrix P(f) based on the VFT w(f) of the receive waveform and the channel matrix H(f);

determining an eigenvalue $\lambda_{max}(f)$ of P(f)C(f);

determining a normalized eigenvector $v_{max}(f)$ corresponding to the $\lambda_{max}(f)$; and determining the transmit waveform $s_{opt}(f)$ from the e normalized igenvector $v_{max}(f)$.

6. The transmitter of claim 5, wherein the eigenvalue $\lambda_{max}(f)$ is the largest eigenvalue of the P(f)C(f).

* * * * *